Aug. 25, 1936.  E. V. TAYLOR  2,051,916
BRAKE
Filed June 25, 1931
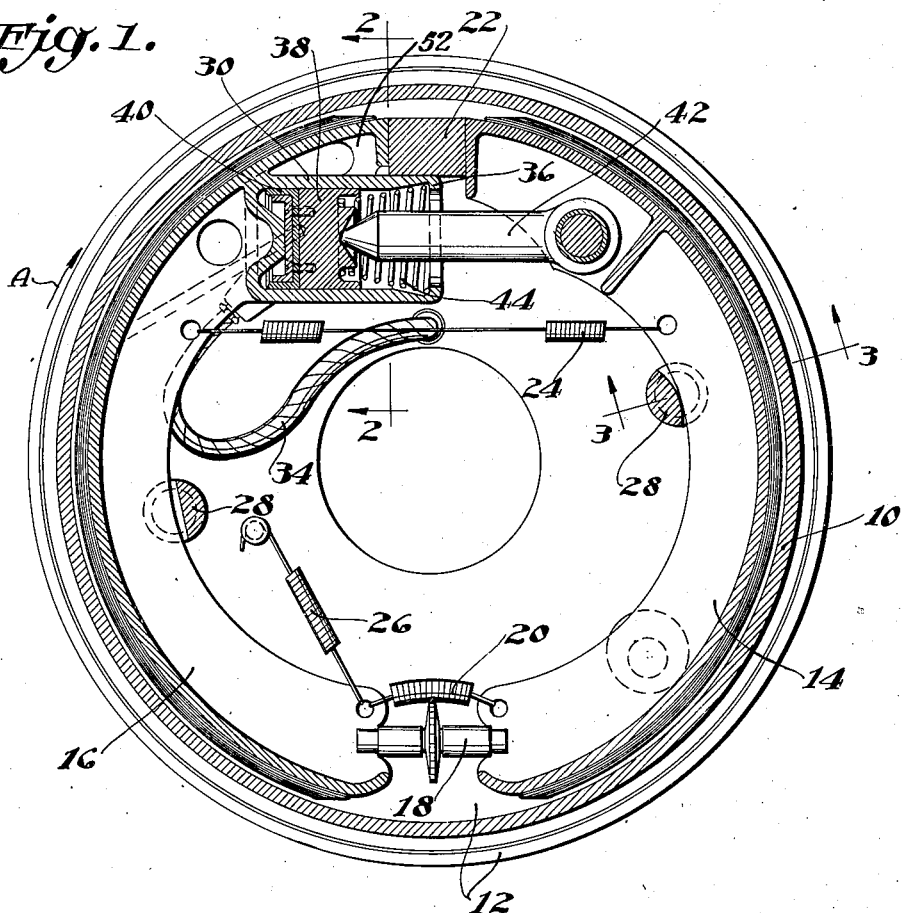
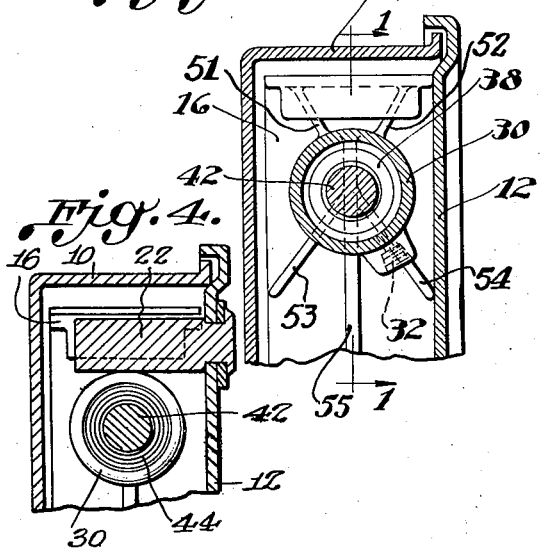
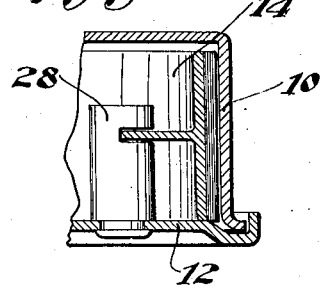
INVENTOR.
EUGENE V. TAYLOR
BY
ATTORNEY.

Patented Aug. 25, 1936

2,051,916

UNITED STATES PATENT OFFICE 2,051,916

BRAKE

Eugene V. Taylor, Chicago, Ill., assignor to Bendix Brake Company, South Bend, Ind., a corporation of Illinois Application June 25, 1931, Serial No. 546,803

9 Claims. (Cl. 188—152)

This invention relates to brakes, and is illustrated as embodied in an internal hydraulic brake for an automobile.

An object of the invention is to simplify the hydraulic actuating mechanism, by mounting the cylinder rigidly of (and preferably making it integral with) the friction means, for example at the unconnected end of one of a pair of adjustably-connected shoes, with a piston or the like in the cylinder arranged to act on the other end of the friction means (i. e. on the other of said shoes). Various features of novelty relate to the form and arrangement of the cylinder, to the provision therein of a novel return spring for the piston, and to the connection of the piston with the other shoe or its equivalent.

The above arrangement, while capable of various uses, is especially advantageous in a brake having an anchor or pair of anchors engaged alternatively by said ends, so that the one shoe or its equivalent anchors when the drum is turning in one direction and the other one when the drum is turning in the other direction.

Other features of novelty relate to structural details of the brake structure, and to other novel combinations of parts and desirable particular constructions which will be apparent from the following description of one illustrative embodiment shown in the accompanying drawing, in which:

Figure 1 is a vertical section through the brake, just inside the head of the brake drum, and showing the brake shoes in side elevation, the section being taken in the plane indicated by the lines 1—1 of Figure 2;

Figure 2 is a partial section through the brake, on the line 2—2 of Figure 1, showing the arrangement of the brake-applying means;

Figure 3 is a partial section on the line 3—3 of Figure 1, showing one of the novel steady rests; and Figure 4 is a view taken through the anchor just to the right of the actuator and looking in the same direction as Figure 2.

The illustrated brake comprises a suitable rotatable drum 10, at the open side of which is a support such as a backing plate 12, and within which is the brake friction means. The friction means of this particular brake is of the shiftable-anchorage type, and may include a pair of shoes 14 and 16, made of cast aluminum or the like, and which are connected at their lower ends by a wear-compensating adjustable thrust link 18 of a known form and against which the shoe ends are held by a spring 20 tensioned between them.

Between the upper ends of the shoes is shown an anchor in the form of a post or abutment 22 carried rigidly by the backing plate, and against which the shoes are held when released by a main return spring 24. If the drum is turning clockwise (vehicle moving forward) when the brake is applied, shoe 16 carrying the cylinder 30 anchors against post 22. If the drum is turning counter-clockwise the shoe 14 anchors. An auxiliary return spring 26 of known type may be tensioned between the backing plate and the lower end of the shoe 16.

The shoes may be provided with novel steady rests in the form of cylindrical posts 28 riveted or otherwise secured to the backing plate and formed with transverse slots embracing the webs of the shoes.

According to an important feature of the invention the shoe 16 or its equivalent is cast or otherwise formed with a rigidly-mounted cylinder 30, preferably at its upper end and integral with the shoe web. Cylinder 30 is closed at the left end, except for an inlet 32 from a hydraulic line 34, and is arranged with its open end facing toward the shoe 14. I prefer to form the open end of the cylinder with an internal annular ledge 36. Diagonal ribs 51, 52, 53 and 54 are formed integral with the shoe web and with the cylinder.

Within the cylinder is a piston 38 or the like, shown faced with rubber packing cups 40, having in its base a conical socket for thrust engagement with the rounded conical end of a piston rod 42 pivoted or otherwise operatively connected to the upper end of the shoe 14. A piston-returning spring 44 may be confined between the ledge 36 and an annular socket in the base of the piston 38.

In operation, pressure applied to the fluid in the lines 34 acts on the piston 38, against the resistance of springs 44, 24, and 26, to apply the brake by forcing the upper ends of the shoes apart. Since the brake-applying force is exactly balanced between the shoes, spring 26 has an auxiliary action in holding shoe 16 against the anchor 22 until the wiping action of the drum determines which of the two shoes is to anchor.

If the vehicle is moving forward or the drum rotating in the direction of the arrow A of Figure 1 when the brake is applied, therefore, the shoe 16 becomes a secondary shoe and remains continuously anchored throughout the operations of applying and releasing the brake and the cylinder 30 remains in the position shown in the drawing. During such operation the shoe 14 acts as a primary shoe. If, however, the vehicle is moving backward at the time the brake is applied, then the wiping action of the drum, as soon as it is preliminarily engaged by shoe 14, shifts the shoes with the drum before the brake is fully applied to bring shoe 14 into anchoring engagement with the post 22.

In the application of the brake when the vehicle is moving backward, the cylinder 30 slides on the anchor 22 but is maintained in contact with the flat side thereof so that normally the cylinder is in engagement with the anchor 22.

This invention is subsequent to the inventions shown in La Brie application, Serial No. 495,809 but is prior to the invention shown in Figures 3 to 8 inclusive of La Brie application, Serial No. 691,746.

While one illustrative embodiment has been described in detail, it is not my intention to limit the scope of the invention to that particular embodiment, or otherwise than by the terms of the appended claims.

I claim:

1. A brake cylinder having an open end and having one end closed and having an internal annular ledge formed integrally therewith at its other end, a piston in said cylinder, and a return spring confined between the piston and said ledge, said ledge being formed by a recess cut into the wall of the cylinder adjacent to the open end of the cylinder.

2. A brake comprising a friction device having separable ends one of which is formed with a cylinder, an anchor formed with a flat side with which said cylinder contacts and along which said cylinder is adapted to slide and positioned between and engageable with one or the other of said ends when the brake is applied, and fluid pressure means in said cylinder formed on said one end and which means acts on the other of said ends to apply the brake.

3. A brake comprising a friction device having separable flat ends one of which is formed with a cylinder, a rectangular anchor with one side of which said cylinder contacts and along which said cylinder is adapted to slide and with the ends of which said flat ends contact and along which said flat ends are adapted to slide, and fluid pressure means including said cylinder for spreading the ends of the friction element to apply the brake.

4. A brake comprising a fixed support, friction means formed with adjacent separable ends and comprising a pair of connected shoes having their separable ends substantially diametrically opposite to the connection between the shoes, one of the separable ends being provided with a cylinder having a closed end and having an open end facing toward the other of the shoe ends, a piston in said cylinder having a piston rod extending through said open end of the cylinder and operatively engaging said other end of the other shoe, an anchor between said separable ends and on which said ends bear, a return spring tensioned between said ends of the friction means and urging the piston toward the closed end of the cylinder, and another spring having one end secured to the cylinder bearing shoe adjacent to its lower end and to said fixed support whereby the cylinder bearing shoe is normally maintained in contact with the anchor and whereby said cylinder bearing shoe is restrained from leaving the anchor during brake application in the forward direction.

5. A brake comprising a friction device having separable ends, a cylinder secured to one of said separable ends, an anchor formed with a flat side with which said cylinder contacts and along which said cylinder is adapted to slide, and fluid pressure means in said cylinder which acts on one of said separable ends to apply the friction device.

6. A brake for an automotive vehicle comprising a friction device arranged to anchor on one end when the vehicle is moving forward and on the opposite end when the vehicle is moving backward, a cylinder formed integrally with the end of said friction device on which it anchors when the vehicle is moving forward, an anchor between said ends on which the friction device anchors, means holding the end of the friction device on which the cylinder is formed more strongly against the anchor than the said opposite end and fluid pressure means in said cylinder which acts on said friction device to apply the brake.

7. A brake for an automotive vehicle comprising a friction device arranged to anchor on one end when the vehicle is moving forward and on the opposite end when the vehicle is moving backward, a cylinder formed integrally with the end of said friction device on which it anchors when the vehicle is moving forward and having a portion which is maintained normally in contact with said anchor, an anchor between said ends on which the friction device anchors, means holding the end of the friction device on which the cylinder is formed more strongly against the anchor than the said opposite end and fluid pressure means in said cylinder which acts on said friction device to apply the brake.

8. A brake for an automotive vehicle comprising a friction device arranged to anchor on one end when the vehicle is moving forward and on the opposite end when the vehicle is moving backward, a cylinder formed integrally with the end of said friction device on which it anchors when the vehicle is moving forward and having a portion which is maintained in contact with said anchor at all times, an anchor between said ends on which the friction device anchors, and fluid pressure means in said cylinder which acts on said friction device to apply the brake.

9. A brake comprising a drum, a primary shoe, a secondary shoe, a spring connecting said shoes, a non-rotatable member, a spring connecting said secondary shoe and said non-rotatable member, a cylinder secured to said secondary shoe, and a piston in said cylinder operatively connected to said primary shoe.

EUGENE V. TAYLOR.